(12) United States Patent
Lee

(10) Patent No.: US 8,823,358 B2
(45) Date of Patent: Sep. 2, 2014

(54) CALIBRATION APPARATUS AND METHOD THEREOF, MULTI-CHANNEL DRIVING CIRCUIT AND CURRENT BALANCING METHOD

(71) Applicant: Leadtrend Technology Corp., Hsin-Chu (TW)

(72) Inventor: Ching-Tsan Lee, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/019,506

(22) Filed: Sep. 5, 2013

(65) Prior Publication Data

US 2014/0001978 A1    Jan. 2, 2014

Related U.S. Application Data

(62) Division of application No. 12/969,572, filed on Dec. 15, 2010, now Pat. No. 8,552,710.

(30) Foreign Application Priority Data

Apr. 13, 2010 (TW) ................ 99111357 A

(51) Int. Cl.
*G01R 17/02* (2006.01)

(52) U.S. Cl.
USPC ........................................... 324/98

(58) Field of Classification Search
USPC ........................................... 324/98
See application file for complete search history.

(56) References Cited

U.S. PATENT DOCUMENTS

| | | | |
|---|---|---|---|
| 2002/0087280 A1* | 7/2002 | To et al. ................. | 702/107 |
| 2007/0222391 A1* | 9/2007 | Lee et al. ................ | 315/82 |
| 2008/0129222 A1* | 6/2008 | Chen et al. .............. | 315/294 |
| 2011/0020105 A1* | 1/2011 | Jain ......................... | 415/1 |
| 2011/0025213 A1* | 2/2011 | Liao ........................ | 315/185 R |

* cited by examiner

*Primary Examiner* — Patrick Assouad
*Assistant Examiner* — Demetrius Pretlow
(74) *Attorney, Agent, or Firm* — Winston Hsu; Scott Margo

(57) ABSTRACT

A calibration method for adjusting an offset voltage of a unit is proposed. The unit, capable of operating in a calibration mode or a normal mode, includes a first input terminal, a second input terminal and an output terminal. The calibration method includes: operating the unit in a calibration mode; providing a programmable voltage to the first input terminal; providing a constant voltage to the second input terminal; adjusting the programmable voltage monotonously when an output status of the output terminal is not changed; latching the programmable voltage when the output status toggles; and operating the unit in a normal mode after the output status toggles.

5 Claims, 4 Drawing Sheets

US 8,823,358 B2

CALIBRATION APPARATUS AND METHOD THEREOF, MULTI-CHANNEL DRIVING CIRCUIT AND CURRENT BALANCING METHOD

CROSS REFERENCE TO RELATED APPLICATIONS

This application is a division of U.S. application Ser. No. 12/969,572 filed on Dec. 15, 2010.

BACKGROUND OF THE INVENTION

1. Field of the Invention

The present invention is related to a calibration apparatus and method thereof.

2. Description of the Prior Art

Current balance is an important specification for an LED (Light Emitting Diode) driving circuit driving chains of LEDs. In conventional specification, the uniformity for the chains of LEDs is required to be within 1%. However, due to the variation in process parameters during manufacturing, the electronic components of the LED driving circuit may not be able to meet the specification of current balance.

FIG. 1 is a diagram illustrating conventional multi-channel LED driving circuit 100. Using power switch $M_1$ and booster 11, input voltage $V_{in}$ is boosted to the voltage level required for driving LED chains 13 and 14. Multi-channel driving circuit 12 is configured to control the channel current of transistors $M_3$ and $M_4$ using current driving circuits 15 and 16, respectively. Each of current driving circuits 15 and 16 compares the voltage signal fed back from corresponding resistors $R_1$ and $R_2$ with reference voltage $V_{REF}$, thereby dynamically controlling the corresponding channel current and further stabilizing the current flowing through resistors $R_1$ and $R_2$. Ideally, if the resistance of resistor $R_1$ equals to that of resistor $R_2$, the current flowing through LED chains 13 and 14 may be equalized for achieving current balance.

However, error amplifiers $OPA_1$ and $OPA_2$ of multi-channel LED driving circuit 100 may not have ideal characteristics. Due to process variations, error amplifiers $OPA_1$ and $OPA_2$ may exhibit unmatched offset voltages, the difference between which is likely to hinder multi-channel LED driving circuit 100 from meeting the specification of current balance.

SUMMARY OF THE INVENTION

The present invention provides a calibration method for adjusting an offset voltage of a unit under calibration. The unit under calibration, having a first input terminal, a second input terminal and an output terminal, is configured to operate in a calibration mode or a normal mode. The calibration method includes operating the unit under calibration in the calibration mode, providing a programmable voltage to the first input terminal, providing a constant voltage to the second input terminal, adjusting the programmable voltage monotonously when an output status of the output terminal remains unchanged, latching the programmable voltage when the output status toggles, and operating the unit under calibration in the normal mode after the output status toggles.

The present invention further provides a calibration apparatus for compensating an offset voltage of a comparator which includes a first input terminal, a second input terminal and an output terminal. The calibration apparatus includes a counter configured to adjust a digital signal monotonously, a programmable voltage generating unit configured to generate a programmable voltage on the first terminal according to a first input voltage and the digital signal, and a latch circuit configured to generate a latched digital signal by latching the digital signal when an output status of the output terminal changes, thereby preventing the programmable voltage from being interfered by the counter. A second input voltage is supplied to the second input terminal and the difference between the first and second input voltages is a constant value.

The present invention further provides a multi-channel driving circuit which provides current balancing. The multi-channel driving circuit includes a plurality of current driving circuits each configured to control a corresponding channel current according to a channel current control voltage. Each current driving circuit includes a comparator having a first input terminal, a second input terminal and an output terminal for controlling the corresponding channel current; a latch circuit configured to provide a latched digital signal; and a compensation voltage generator configured to generate a compensation voltage according to the latched digital signal. A sum of the compensation voltage and a first input voltage is supplied to one input terminal among the first and second input terminals. A second input voltage is supplied to the other input terminal among the first and second input terminals. One input voltage among the first and second input voltages corresponds to the channel current. The other input voltage among the first and second input voltages corresponds to the channel current control voltage.

The present invention further provides a current balancing method for driving multiple channels. The current balancing method includes adjusting a digital signal monotonously and, for each corresponding channel, adjusting a compensation voltage according to the digital signal, providing a sum of the compensation voltage and a first input voltage to a first input terminal of a comparator, providing a second input voltage to a second input terminal of the comparator, generating a latched digital signal by latching the digital signal when an output status of an output terminal of the comparator changes, and controlling the comparator according to the latched digital signal, a channel current control voltage and a corresponding feedback voltage for driving the corresponding channel. A difference between the first and second input voltages is a constant value, and the corresponding feedback voltage is associated with a current flowing through the corresponding channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
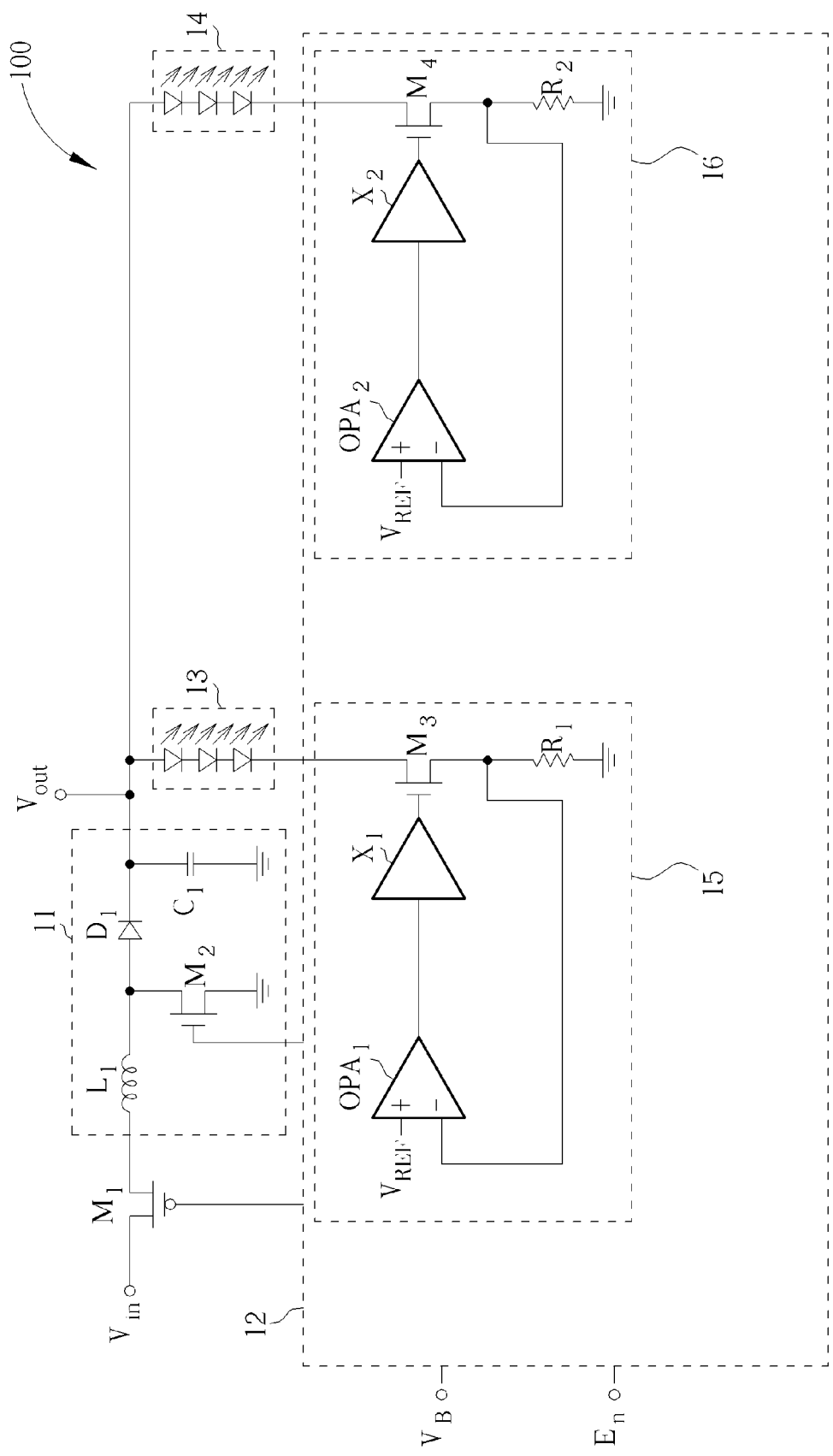
FIG. 1 is a diagram illustrating a conventional multi-channel LED driving circuit.
Figure 2:
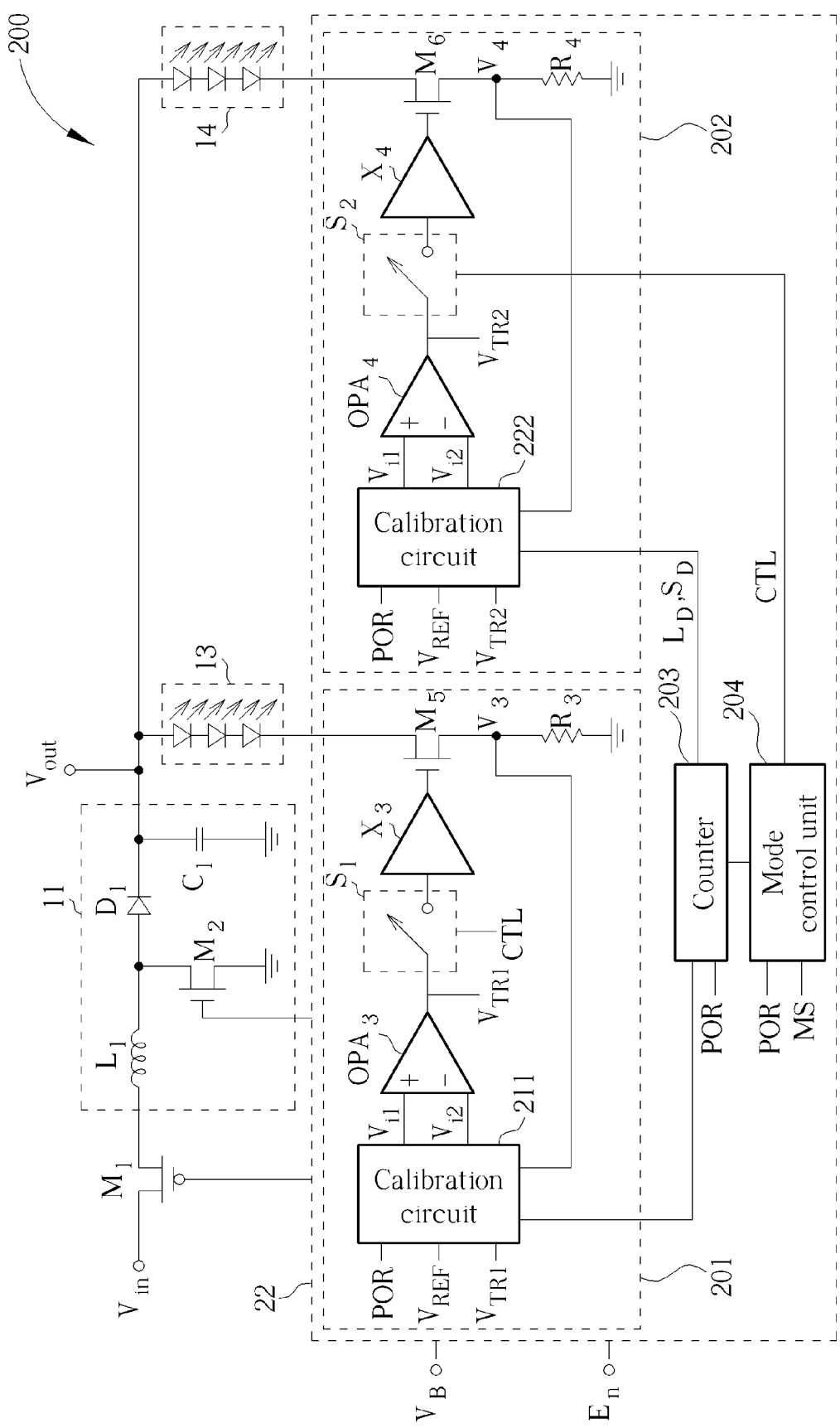
FIG. 2 is a diagram illustrating a multi-channel LED driving circuit according to an embodiment of the present invention.

FIG. 2 is a diagram illustrating multi-channel LED driving circuit 200 according to an embodiment of the present invention. Multi-channel LED driving circuit 200 also includes booster 11 and LED chains 13 and 14, which may be implemented as depicted in FIG. 1, or may adopt other devices having similar function as well known to those skilled in the art. As shown in FIG. 2, multi-channel LED driving circuit 200 further includes current driving circuits 201 and 202, counter 203 and mode control unit 204. Current driving circuit 201, including calibration circuit 211 and switch $S_1$, is configured to adjust a unit under calibration (such as error amplifier $OPA_3$). So is current driving circuit 202. Mode control unit 204 switches driving circuits 201 and 202 to a calibration mode or a normal mode. Since both current driving circuits 201 and 202 operate in the same manner, only the operation of current driving circuit 201 is described in subsequent paragraphs.

In the normal mode when switch $S_1$ is turned on (short-circuited), calibration circuit 211 may provide level shift to reference voltage $V_{REF}$, feedback voltage $V_3$ (the voltage signal fed from resistor $R_3$), or both. Calibration circuit 211 converts reference voltage $V_{REF}$ and feedback voltage $V_3$ into two input voltages $V_{i1}$ and $V_{i2}$ based on which error amplifier $OPA_3$ may control the control terminal of transistor switch $M_5$, thereby regulating the current flowing through resistor $R_3$. Therefore, calibration circuit 211 and error amplifier $OPA_3$ together function as equivalent error amplifier $OPA_X$, to which reference voltage $V_{REF}$ and feedback voltage $V_3$ are supplied as the two input signals. Reference voltage $V_{REF}$ may be viewed as a channel current control voltage. The amount of constant level shift provided by calibration circuit 211 is determined in the calibration mode.

In the calibration mode, switch $S_1$ is turned off (open-circuited). In one embodiment, calibration circuit 211 provides two input voltages $V_{i1}$ and $V_{i2}$ to error amplifier $OPA_3$ by commonly shifting reference voltage $V_{REF}$. In one embodiment, voltage shift $V_{shift1}$, the difference between reference voltage $V_{REF}$ and input voltages $V_{i1}$ varies with the output of counter 203, while voltage shift $V_{shift2}$, the difference between reference voltage $V_{REF}$ and input voltages $V_{i2}$, is constant. After entering the calibration mode, output of counter 204 increases or decreases monotonously, and voltage shift $V_{shift1}$ provided by calibration circuit 211 increases or decreases with the output of counter 203 accordingly. After the offset voltage of error amplifier $OPA_X$ reaches a predetermined value, output $V_{TR1}$ of error amplifier $OPA_3$ toggles. After then, calibration circuit 211 is configured to latch voltage shift $V_{shift1}$ so as to prevent interference associated with the output of counter 203. As counter 203 continues to vary, the voltage shifts of other calibration circuits (such as that of calibration circuit 222) may be adjusted until the voltage shift provided by each calibration circuit has been latched. Latched voltage shift $V_{shift1}$ and constant voltage shift $V_{shift2}$ may thus be used in the normal mode. Under such circumstance, the voltage shift of the equivalent error amplifier in each current driving circuit may be maintained within a range defined by the same predetermined value, which allows multi-channel LED driving circuit 200 to meet the specification of current balance.

Figure 3:
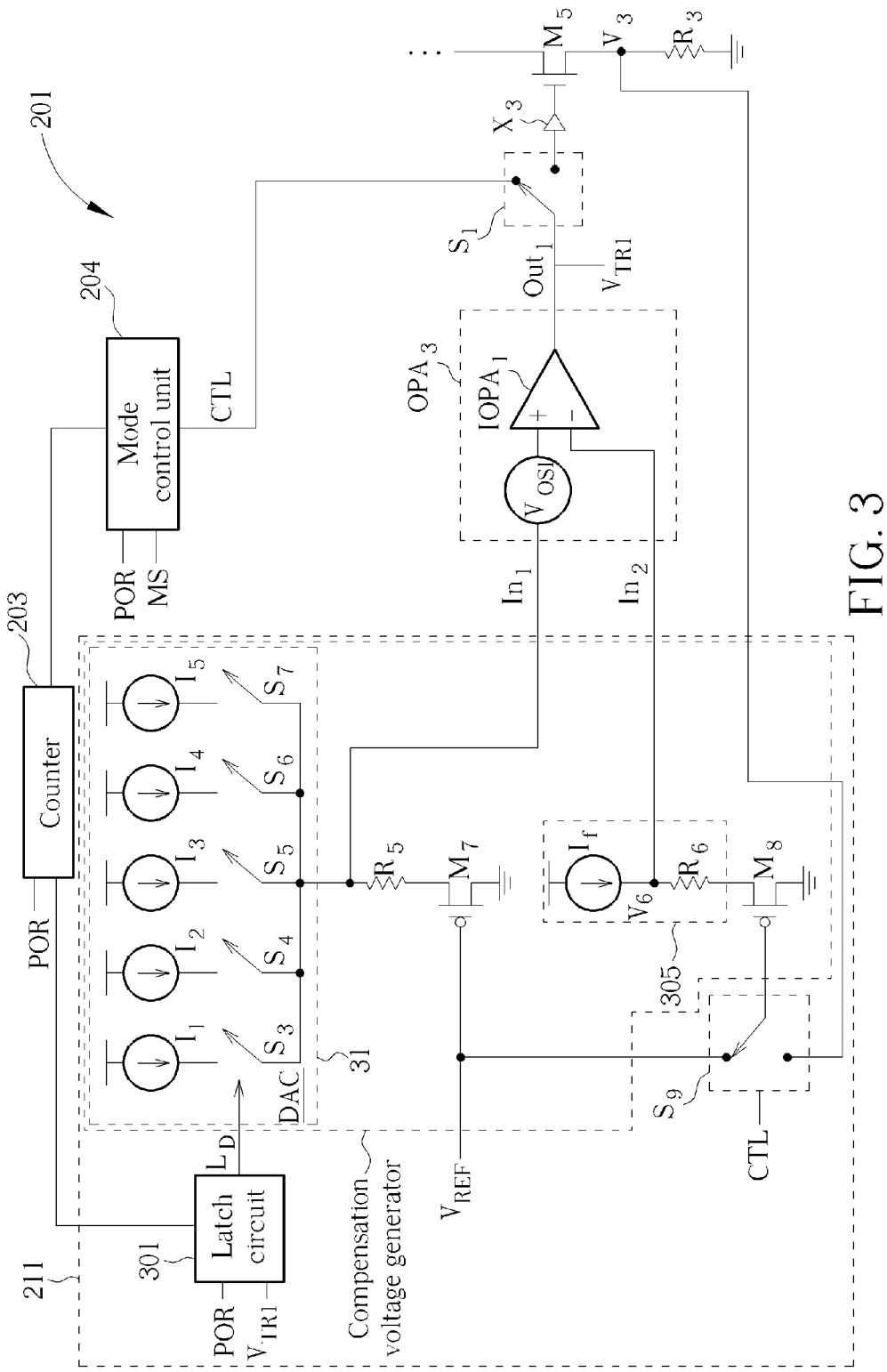
FIG. 3 is a detailed diagram illustrating a calibration apparatus according to an embodiment of the present invention.

FIG. 3 is a detailed diagram illustrating an embodiment of current driving circuit 201 and related peripheral devices. Compared to ideal error amplifier $IOPA_1$, non-ideal error amplifier $OPA_3$ exhibits offset voltage $V_{OS1}$ which may occur on any input terminal. For ease of illustration, it is assumed that offset voltage $V_{OS1}$ occurs on first input terminal $I_1$ of error amplifier $OPA_3$.

In the calibration mode when switch $S_1$ disconnects non-ideal error amplifier $OPA_3$ from $X_3$, reference voltage $V_{REF}$ is supplied to the control terminal of transistor $M_8$ via switch $S_9$, and feedback voltage $V_3$ (the voltage signal fed from resistor $R_3$) is isolated from the control terminal of transistor $M_8$.

Transistor $M_8$ and adder 305 are configured to shift reference voltage $V_{REF}$, thereby generating corresponding input voltage $V_{i2}$ (on second input terminal $In_2$ of error amplifier $OPA_3$). Voltage shift $V_{shift2}$ may be obtained as follows:

$$V_{shift2}=V_{th8}+I_f*R_{R6} \qquad (1)$$

In equation (1), $V_{th8}$ represents the threshold voltage of transistor $M_8$, $I_f$ the current flowing through resistor $R_6$, and $R_{R6}$ the resistance of resistor $R_6$. In this embodiment, voltage shift $V_{shift2}$ has a constant value since $V_{th8}$, $M_8$ and $I_f$ are all constants.

Digital-to-analog converter (DAC) 31 is configured to supply analog signal current $I(L_D)$ to resistor $R_5$ by selecting one current source or a combination of current sources from current sources $I_1$-$I_5$ according to digital signal $L_D$. Similar to the operation of transistor $M_8$ and adder 305, voltage shift $V_{shift2}$ between input voltage $V_{i1}$ (on first input terminal $IN_1$ of error amplifier $OPA_3$) and reference voltage $V_{REF}$ may be obtained as follows:

$$V_{shift1}=V_{th7}+I(L_D)*R_{R5} \qquad (2)$$

In equation (2), $V_{th7}$ represents the threshold voltage of transistor $M_7$, and $R_{R5}$ the resistance of resistor $R_5$. In this embodiment, input voltage $V_{i1}$ is a programmable voltage since the current flowing through resistor $R_5$ may be programmed according to digital signal $L_D$.

Upon entering the calibration mode, latch circuit 301 does not function, and digital signals $L_D$ and $S_D$ both increase or decrease monotonously with counter 203. As digital signal $L_D$ varies, voltage shift $V_{shift1}$ and input voltage $V_{i1}$ also change accordingly. Once the difference between input voltages $V_{i1}$ and $V_{i2}$ exceeds a specific value, error amplifier $OPA_3$ changes its output signal $V_{TR1}$, which in turn triggers latch circuit 301. When latch circuit 301 is functioning, digital signal $L_D$ is latched at a constant value and no longer varies with digital signal $S_D$. Therefore, digital signal $L_D$ may be viewed as a latched digital signal.

In the normal mode, digital signal $L_D$ remained latched and is not influenced by output signal $V_{TR1}$. Switch $S_1$ shorts output $Out_1$ to $X_3$, and feedback voltage $V_3$ (the voltage signal fed from resistor $R_3$) is supplied to the control terminal of transistor $M_8$ via switch $S_9$.

In FIG. 3, it is assumed that offset voltage $V_{os1}$ of error amplifier $OPA_3$ is 0.03V, voltage shift $V_{shift1}$ is (0.8+$L_D*0.001$)V, voltage shift $V_{shift2}$ is 0.85V, counter 203 outputs 5-bit digital signal (count values between 0 and 32), and reference voltage $V_{REF}$ is 0.5V.

Figure 4:
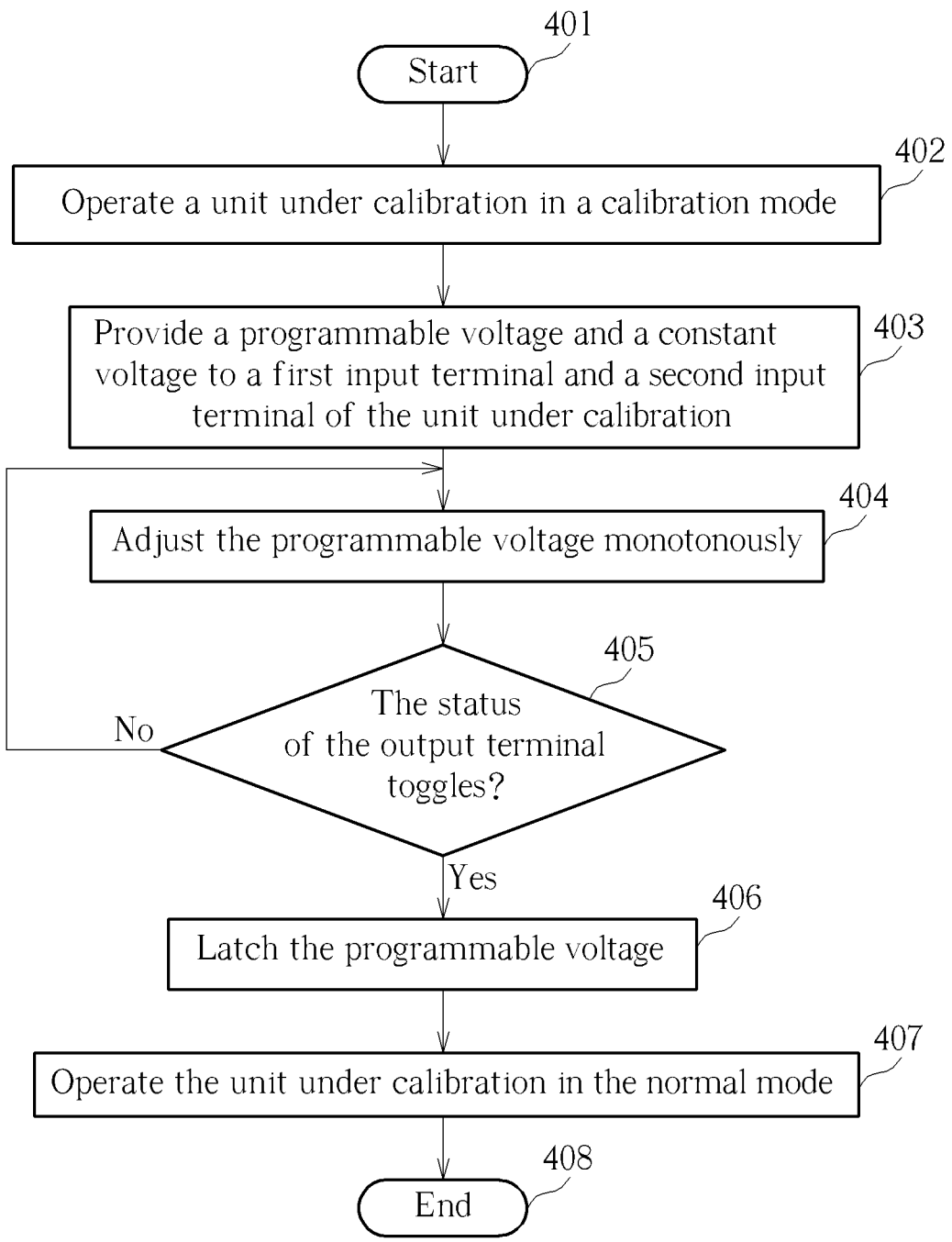
FIG. 4 is a flowchart illustrating a calibration method according to the present invention.

A calibration method using calibration circuit 211 is provided so that those skilled the art may practice the present invention from the disclosure. FIG. 4 is a flowchart illustrating the calibration method according to the present invention. In FIG. 4, the calibration method begins with step 401, then followed by step 402 in which mode control unit 204 operates switches $S_1$ and $S_9$ so that the unit under calibration $OPA_3$ in current driving circuit 201 operates in a calibration mode.

In step 403, input voltage $V_{i1}$ supplied to first terminal $In_1$ is ($V_{REF}$+$V_{shift1}$), whose value, (1.3+$L_D*0.001$)V, may be programmed by digital signal $L_D$; input voltage $V_{i2}$ supplied to second terminal $In_2$ is ($V_{REF}$+$V_{shift2}$), which has a constant value of 1.35V. Since the initial value of counter 203 is 0, currently input voltage $V_{i1}$ is 1.3V and the voltage difference between the positive and negative input terminals of ideal error amplifier $IOPA_1$ is −0.02V (=1.3V+0.03V−1.35V), thereby generating logic 0 as output signal $V_{TR1}$.

In step 404 when counter 203 is increased monotonously by 1, digital signals $S_D$ and $L_D$ become 1, input voltage $V_{i1}$ increases by 0.001V and becomes 1.301V, the voltage difference between the positive and negative input terminals of ideal error amplifier $IOPA_1$ becomes −0.019V, and output signal $V_{TR1}$ remains at logic 0.

In step 405, it is determined whether the status of the output terminal changes. If output signal $V_{TR1}$ remains at logic 0, the calibration method goes back to step 404 after step 405 for increasing counter 203 further by 1. Therefore, the voltage difference between the positive and negative input terminals of ideal error amplifier $IOPA_1$ increases by 0.001V after each time step 404 is executed. After looping back to step 404 subsequent to step 405 several times, digital signal $S_D$ may be increased to 21, and the voltage difference between the positive and negative input terminals of ideal error amplifier $IOPA_1$ may reach 0.001V. As a result, output signal $V_{TR1}$ switches to logic 1. Since the status of the output terminal has been changed, step 406 is executed after step 405 instead of looping back to step 404.

In step 406, latch circuit 301 latches the current value of digital signal $L_D$ (=21) and the states of switches $SW_1$-$SW_5$, thereby latching input voltage $V_{i1}$ equivalently. After that, digital signal $L_D$ in current driving circuit 201 remains constant even if counter 203 continues to increase. Under such circumstance, voltage shift $V_{shift1}$ of current driving circuit 201 is fixed to 0.821V (=0.8+21*0.001), voltage shift $V_{shift2}$ is still 0.85V, and the voltage difference between the two input terminals of equivalent error amplifier $OPA_X$ is about 0.001V (=$V_{shift1}$+$V_{os1}$−$V_{shift2}$=0.821+0.03−0.85).

In step 407, mode control unit 204 operates switches $SW_1$ and $SW_9$ so that the unit under calibration $OPA_3$ may return to the same state as those of current driving circuits 15 and 16 in FIG. 1, thereby operating current driving circuit 201 in a normal mode.

The calibration method ends in step 408. When operating a current driving circuit according to the flowchart in FIG. 4, the voltage difference between the two input terminals of the equivalent error amplifier is nearly zero (between 0 and 0.001V), thereby capable of achieving current balance.

In the embodiment illustrated in FIG. 3, the programmable voltage shift is provided to the positive input terminal of error amplifier $OPA_3$. In another embodiment, the programmable voltage shift may be provided to the negative input terminal of error amplifier $OPA_3$.

In the embodiment illustrated in FIG. 3, reference voltage $V_{REF}$ and feedback voltage $V_3$ are respectively coupled to the positive and negative input terminals of error amplifier $OPA_3$. In another embodiment, feedback voltage $V_3$ and reference voltage $V_{REF}$ may be respectively coupled to the positive and negative input terminals of error amplifier $OPA_3$.

In the embodiment illustrated in FIG. 3, reference voltage $V_{REF}$ is supplied to the control terminals of both transistors $M_7$ and $M_8$. In another embodiment, two different reference voltages may be supplied to the control terminals of transistors $M_7$ and $M_8$ as long as the difference between these two reference voltages remains substantially constant.

Normally, a driving circuit is able to execute a soft-start procedure. When multi-channel LED driving circuit 200 in FIG. 2 executes a soft-start procedure, for example, voltage $V_{out}$ is gradually raised to the working voltage required for driving LED chains 13 and 14. During the period when the soft-start procedure is executed, LED chains 13 and 14 does not light, and the calibration mode illustrated in FIG. 4 may be operable while executing the soft-start procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-channel driving circuit which provides current balancing, comprising:
   a plurality of current driving circuits each configured to control a corresponding channel current according to a channel current control voltage, each current driving circuit comprising:
   a comparator having a first input terminal, a second input terminal and an output terminal for controlling the corresponding channel current;
   a latch circuit configured to provide a latched digital signal; and
   a compensation voltage generator configured to generate a compensation voltage according to the latched digital signal, wherein:
   a sum of the compensation voltage and a first input voltage is supplied to one input terminal among the first and second input terminals;
   a second input voltage is supplied to the other input terminal among the first and second input terminals;
   one input voltage among the first and second input voltages corresponds to the channel current; and
   the other input voltage among the first and second input voltages corresponds to the channel current control voltage.

2. The multi-channel driving circuit of claim 1 further comprising:
   a counter configured to adjusting a digital signal monotonously; wherein in each driving circuit when an output status of the output terminal of the comparator changes, the latch circuit generates a latched digital signal by latching the digital signal.

3. The multi-channel driving circuit of claim 1 wherein each driving circuit is configured to drive at least one corresponding light-emitting unit, and comprises:
   a resistor for detecting a current flowing through the corresponding light-emitting unit.

4. The multi-channel driving circuit of claim 1 wherein the compensation voltage generator comprises:
   a digital-to-analog converter (DAC) configured to generate a corresponding analog signal according to the digital signal; and
   an adder configured to generate the compensation voltage by summing the corresponding analog signal and the first input voltage.

5. The multi-channel driving circuit of claim 1 wherein the DAC is configured to convert the digital signal into a current signal and the adder includes a resistor through which the current signal flows.

* * * * *